United States Patent
Blevins et al.

(10) Patent No.: US 9,246,335 B2
(45) Date of Patent: Jan. 26, 2016

(54) FUEL EFFICIENCY OPTIMIZATION FOR MICROGRID SYSTEMS EMPLOYING MULTIPLE GENERATORS

(75) Inventors: William Mark Blevins, Albuquerque, NM (US); Gregory Brainard, Rio Rancho, NM (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 779 days.

(21) Appl. No.: 13/532,638

(22) Filed: Jun. 25, 2012

(65) Prior Publication Data

US 2013/0342020 A1    Dec. 26, 2013

(51) Int. Cl.
  *H02J 1/00*   (2006.01)
  *H02J 3/00*   (2006.01)
  *H02J 4/00*   (2006.01)
  *H02J 3/38*   (2006.01)

(52) U.S. Cl.
  CPC .. *H02J 4/00* (2013.01); *H02J 3/382* (2013.01); *Y10T 307/718* (2015.04)

(58) Field of Classification Search
  CPC ............. H02J 3/382; H02J 4/00; H02J 3/386; H02J 3/383; H02J 3/38; H02J 3/46; H02J 3/24; H02J 7/35; H02J 3/00; H02J 3/40; H02J 17/00; H02J 1/10; H02J 3/16; H02J 3/381; H02J 7/1423; H02J 3/008
  USPC ............................................................ 307/84
  See application file for complete search history.

(56) References Cited

U.S. PATENT DOCUMENTS

| | | | |
|---|---|---|---|
| 3,731,664 A * | 5/1973 | Tsuzuki et al. ............... | 123/357 |
| 7,233,843 B2 * | 6/2007 | Budhraja et al. ............. | 700/291 |
| 2009/0066159 A1 * | 3/2009 | Peuser ............................ | 307/43 |
| 2010/0110077 A1 * | 5/2010 | Grossman et al. ............ | 345/440 |
| 2010/0274407 A1 * | 10/2010 | Creed ............................ | 700/295 |
| 2012/0022713 A1 * | 1/2012 | Deaver et al. ................. | 700/298 |
| 2013/0342012 A1 * | 12/2013 | Seaton et al. .................. | 307/18 |

* cited by examiner

*Primary Examiner* — Jared Fureman
*Assistant Examiner* — Esayas Yeshaw
(74) *Attorney, Agent, or Firm* — Shimokaji IP (57) ABSTRACT

A system designed to optimize fuel efficiency of a power grid includes a set of controllable generators designed to supply power to the power grid. Each generator in the set is associated with a controller, a set of loads designed to draw power from the power grid, and a grid controller designed to provide a load partitioned configuration for the set of controllable generators, based at least partly on the power draw of the set of loads.

19 Claims, 7 Drawing Sheets

FUEL EFFICIENCY OPTIMIZATION FOR MICROGRID SYSTEMS EMPLOYING MULTIPLE GENERATORS

BACKGROUND AND SUMMARY OF THE INVENTION

The present invention generally relates to a way of optimizing fuel efficiency for an ensemble of generators being managed by a microgrid system. Currently, such systems may select a sub-set of generators that is able to power a particular aggregate load. Such determination may involve simply selecting the smallest generator that is able to supply the given load, or operating multiple generators in a less-than-optimal configuration. However, such a determination may not provide the most efficient solution in a system where multiple generators are required (and/or where multiple generators may be operated continuously regardless of actual loading conditions).

In addition, current microgrid systems may not recognize and adjust to real-time parameters (e.g., environmental conditions, subsystem maintenance levels, operational imperatives, etc.) and thus may have sub-optimal performance induced by internal and external variations.

Moreover, current microgrid systems may require extensive setup (including configuration and tuning) by experienced personnel. This requirement for microgrid initialization and/or calibration can be accomplished in a much timelier and more cost effective manner.

As can be seen, there is a need for an adaptable microgrid power management feature that optimizes fuel efficiency. In addition, there is a need for a self-configuring, auto-tuning grid requiring minimal manual inputs/oversight.

In one aspect of the present invention, a system designed to optimize fuel efficiency of a microgrid includes a set of controllable generators intended to supply power to the local grid, each generator in the set being associated with an embedded controller, a set of loads powered from the grid, and a microgrid supervisory controller designed to analyze and control generator engine torques on a system wide basis, based at least partly on microgrid monitored system loading.

In another aspect of the present invention, a method of optimizing fuel efficiency for a microgrid system includes determining the set of available generators and their performance characteristics, determining current system load conditions, computing all possible load partitions between generators, based at least partly on the set of available generators and based at least partly on system load conditions, each possible load partitioning solution being associated with a total fuel consumption, and identifying a load partition between generators with a minimum total fuel consumption from among all possible load partition solutions.

Another aspect of the present invention utilizes the development (and maintenance) of generator performance characterizations (models), the most important being a given unit's fuel efficiency as a function of load. The method includes incorporating characteristics provided by the generator manufacturer; characterizations performed during microgrid setup and calibration, and automated updates to system data sets based on continuous performance monitoring and data collection.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. Broadly, embodiments of the present invention generally seek to provide a way to optimize usage of a set of generators providing power to a set of loads. Some embodiments may evaluate the characteristics of the generators to determine a load partition configuration that minimizes fuel consumption for a particular set of operating conditions.

Figure 1:
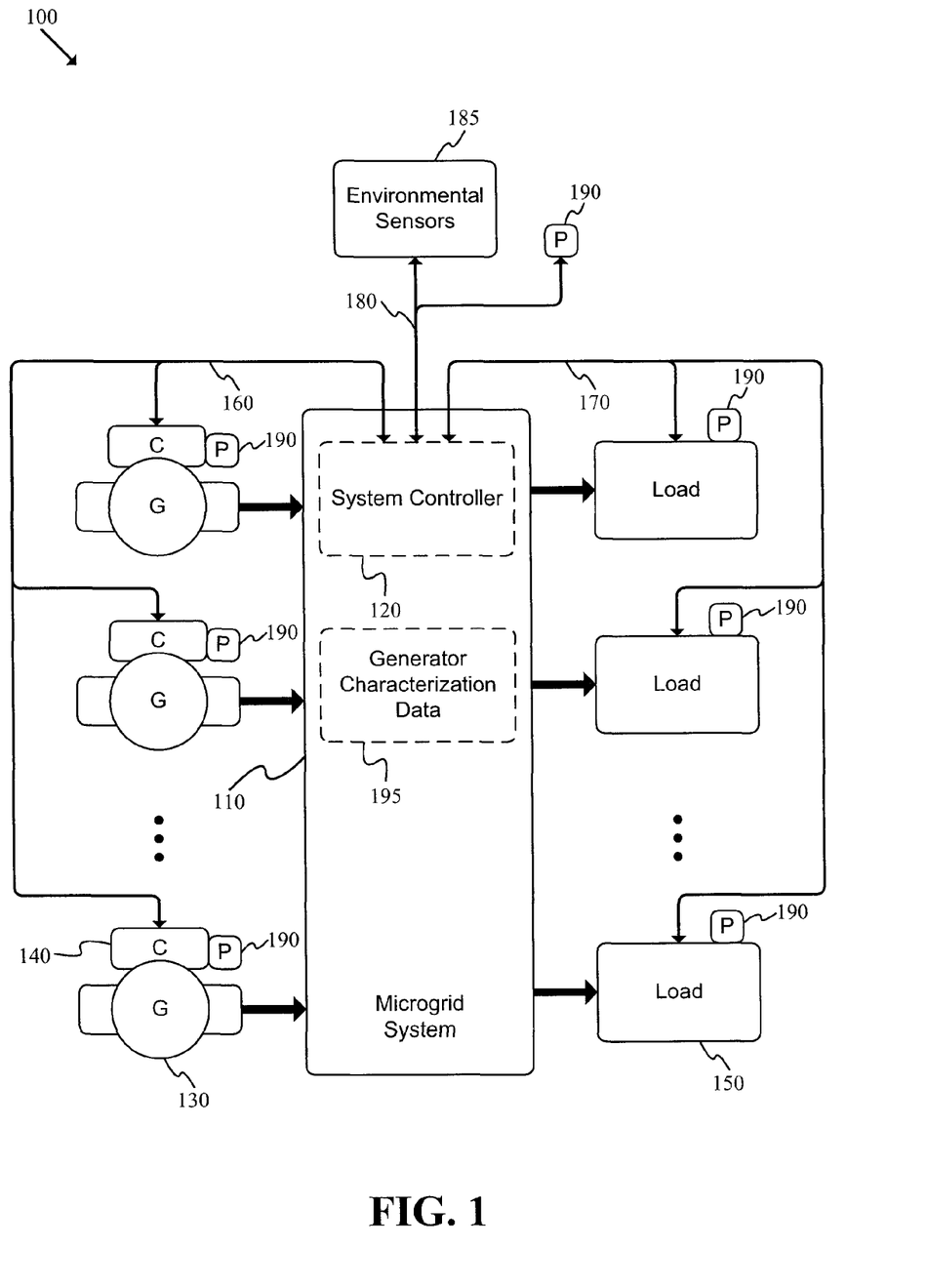
FIG. 1 illustrates a schematic block diagram of a microgrid system according to an exemplary embodiment of the present invention.

FIG. 1 illustrates a schematic block diagram of system 100 having a microgrid power management system 110 according to an exemplary embodiment of the present invention. Specifically, this figure shows various data and control pathways and system elements that may be used to evaluate system performance and provide optimized generator usage in some embodiments.

As shown, the system 100 includes a microgrid 110 which includes a system controller 120, multiple generators 130, each having a dedicated controller 140, one or more loads 150, a first data and control bus 160, a second data and control bus 170, a third data and control bus 180, one or more environmental sensors 185, one or more performance sensors 190, and microgrid system memory 195 that hosts and retains generator data and characterizations. Although the possible embodiment shown in FIG. 1 has three sources and three loads for the purpose of illustration, it is understood that that the invention described can be scaled to operate any required number of sources and loads for a given microgrid system. The principles of operation will remain the same.

The microgrid power management system 110 may include various components that are able to connect a set of generators to a set of loads. The microgrid system may be controllable by a combination of central and distributed control modules. The system controller 120 may include various hardware and/or software elements that are capable of retrieving data regarding the operation of the microgrid system 110 and processing the data to evaluate alternative load partition configurations.

The generators 130 may include various mechanical, electrical, electronic and/or other elements, as appropriate (e.g., diesel-powered generator having associated electronic controllers). Each generator may have different characteristics and/or capabilities (e.g., different generators may deliver different maximum amounts of power, different generators may have different response times to changes in load, etc.). Such generators may be operated in a way that the generators are able to drive a range of loads based on an input signal (e.g., a throttle signal).

In addition, the system may include one or more other types of power sources, such as wind-powered sources, solar-powered sources, batteries, etc. The other sources may be able to be controlled in various appropriate ways (e.g., by sending a signal to the source indicating a desired output), may provide an essentially constant output (e.g., a battery), or may provide a variable output determined by outside factors (e.g., a wind-driven generator).

Each generator may include an associated controller 140. The controller may include various mechanical, electronic, software, and/or other components, as appropriate, and may be designed to control the operation of the associated generator 130. The controller 140 may be designed to communicate with the microgrid system 110 to receive control inputs from the system controller 120, or provide data outputs to the system controller 120. Such communication may be facilitated by the system controller 120. The generator controller 140 may be designed to control the operation of the associated generator 130 based at least partly on inputs received from the microgrid system 110. In addition, the generator controller 140 may be designed to provide feedback regarding performance of the associated generator 130 to the microgrid system 110.

Each load 150 may be any entity or set of entities capable of drawing power from the power distribution network managed by the microgrid system 110. Each load may be constant (e.g., the load may draw a constant current at a particular voltage) or dynamic (e.g., the load may have changing current draw at a particular voltage). Such variations may be associated with various appropriate conditions (e.g., operating conditions of the load, environmental factors such as temperature, etc.).

The first data and control bus 160 may be designed to transfer control signals and/or data between the microgrid system 110 (e.g., using the system controller 120) and the generators 130 (e.g., using the controller 140 associated with each source). Such a data and control bus 160 may be implemented in various appropriate ways. For instance, the connections among the components may include wired connections, wireless connections, network connections, direct connections, etc. In addition, the system controller 120 and/or generator controllers 140 may operate using various interfaces and/or communications protocols (e.g., Modbus, supervisory control and data acquisition or "SCADA", etc.).

The second data and control bus 170 may be designed to transfer control signals and/or data between the microgrid system 110 (e.g., using the system controller 120), and the microgrid loads 150. Such a data and control bus 170 may be implemented in various appropriate ways. For instance, the connections among the components may include wired connections, wireless connections, network connections, direct connections, etc. In addition, the system controller 120 and/or loads 150 may operate using various interfaces and/or communications protocols (e.g., Modbus, supervisory control and data acquisition or "SCADA", etc.).

The third data and control bus 180 may be designed to transfer control signals and/or data between the microgrid system 110 (e.g., using the system controller 120) and various other system resources (e.g., one or more environmental sensors 185, one or more performance sensors 190, etc.). Such a data and control bus 180 may be implemented in various appropriate ways. For instance, the connections among the components may include wired connections, wireless connections, network connections, direct connections, etc. In addition, the system controller 120 and/or other resources 185-190 may operate using various interfaces and/or communications protocols (e.g., Modbus, supervisory control and data acquisition or "SCADA", etc.).

The environmental sensors 185 may include various components designed to measure various environmental conditions (e.g., temperature, humidity, etc.) at the generators 130, loads 150, and/or additional locations advantageous to system management operations, and to communicate the measurement data to the system controller 120 or other appropriate sub-system. The performance sensors 190 may include various components designed to measure various performance parameters (e.g., fuel consumption, fuel/air ratio, voltage, current, power output, load, runtime, etc.) related to the operating performance of the generators 130 and/or the microgrid system 110 and to communicate the measurement data to the system controller 120 or other appropriate sub-system.

The operation of the system 100 will be described in reference to FIG. 5 below.

One of ordinary skill in the art will recognize that system 100 is conceptual in nature and may be implemented in various appropriate ways without departing from the spirit of the invention. For instance, some or all of the various other components 185-190 may be included at the generator controllers 140 or loads 150 and may communicate with the power grid over the first data and control bus 160 and/or the second data and control bus 170. As another example, the three data and control busses 160-180 may be implemented as a single bus in some embodiments.

Figure 2:
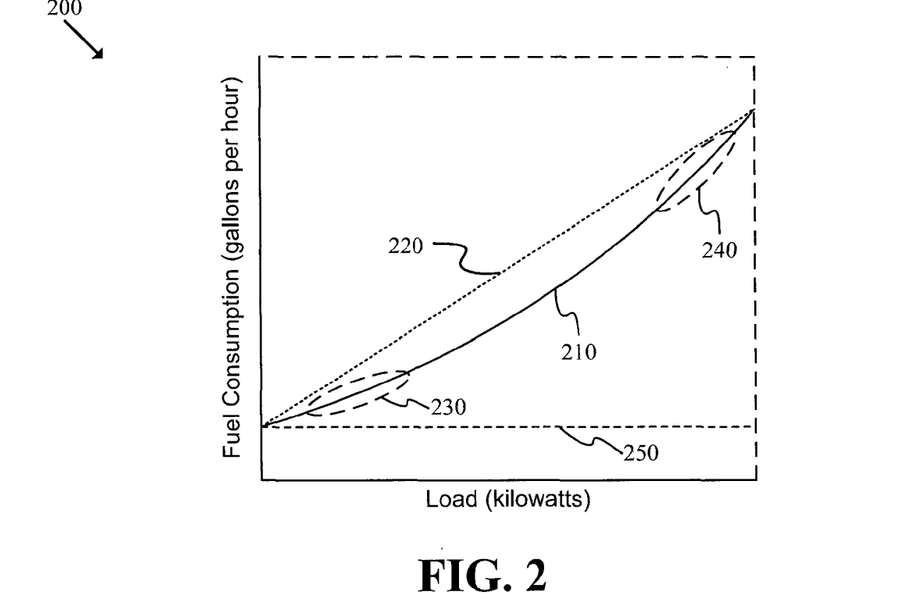
FIG. 2 illustrates a graph of a conceptual characteristic curve of a typical generator included in the microgrid system of FIG. 1.

FIG. 2 illustrates a graph 200 of a conceptual characteristic curve 210 of an example generator included in the power grid of FIG. 1. Specifically, this figure highlights the non-linear nature of the relationship between load and fuel consumption of many generators (e.g., diesel generators). As shown, the graph 200 includes the example curve 210, a straight line 220 fitted to the endpoints of the example curve 210, a first section of the curve 230, a second section of the curve 240, and a line indicating minimum fuel consumption 250.

The non-linear response of the example of FIG. 2 may allow for optimization of generator usage in situations where load conditions require the operation of more than one generator. In addition, the fact that there is a minimum consumption 250 regardless of load may allow for optimization based on the availability of multiple generators that may be of identical or of various capacities. Such optimization will be described by reference to FIGS. 3 and 4 below.

One of ordinary skill in the art will recognize that the graph 200 of FIG. 2 is conceptual in nature and not intended to accurately represent the degree of deviation from a linear response, nor any specific generator. Different generators may have different characteristic curves with different fundamental characteristics that may alter the optimization of generator usage, as appropriate. These generator characteristics may be determined in various appropriate ways (e.g., based on manufacturer specifications, based on data obtained during previous operation of the generators, based on current [real time] sensed parameters, etc.).

Figure 3:
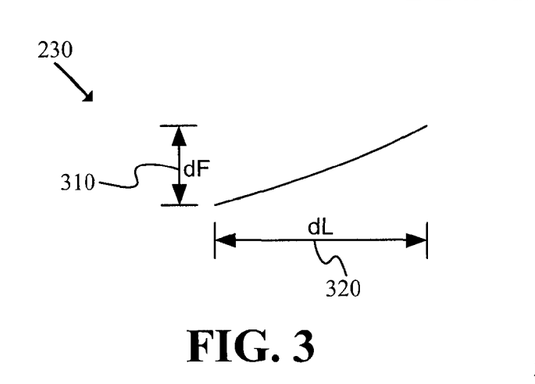
FIG. 3 illustrates an enlarged view of a first section of the curve of FIG. 2 where a relatively large load increment results in a modest increase in fuel consumption.

FIG. 3 illustrates an enlarged view of a first section 230 of the curve 210 of FIG. 2. Specifically, this figure illustrates a region of the response curve where a relatively large load change results in a relatively small change in fuel consumption. As shown, the section 230 includes a change in fuel consumption 310 associated with a change in load 320. In this region of the characteristic curve, for a particular magnitude change in load 320, the resulting change in magnitude of fuel usage 310 may be less than the corresponding change at a different section along the curve.

Figure 4:
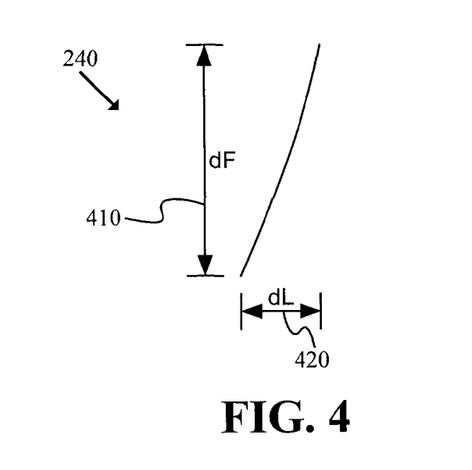
FIG. 4 illustrates an enlarged view of a second section of the curve of FIG. 2 where a relatively modest load increment requires a large increase in fuel consumption.

FIG. 4 illustrates an enlarged view of a second region 240 of the generator response curve 210 of FIG. 2. Specifically, this figure illustrates a region where a relatively small change in generator load results in a relatively large change in fuel consumption. As shown, the section 240 includes a change in fuel consumption 410 associated with a change in load 420. In this region of the characteristic response, for a particular magnitude change in load 420, the resulting change in magnitude of fuel usage 410 may be greater than the corresponding change at a different section along the curve.

It is clear that for microgrid systems operating a single generator there is one fuel consumption rate for any given aggregate load. However, for systems operating (or able to operate) multiple generators (with sophisticated control capabilities) a range of fuel use rates is possible for load conditions that fall outside the capacity of a single generator.

As one example of optimization offered by the non-linear response described in FIGS. 2-4, a system with two generators will be described. In such a system, a first generator may be operating at a region along the curve similar to the region shown in FIG. 3, while a second generator may be operating at a region along the curve similar to the region shown in FIG. 4. In such a case, if an increase in load is presented, a majority of the increase may be assigned to the first generator, as the resulting increase in fuel consumption may be smaller than the increase for the second generator. As another example, if a decrease in load is presented, a majority of the decrease may be assigned to the second generator, as the resulting decrease in fuel consumption may be greater than the decrease for the first generator.

Figure 8:
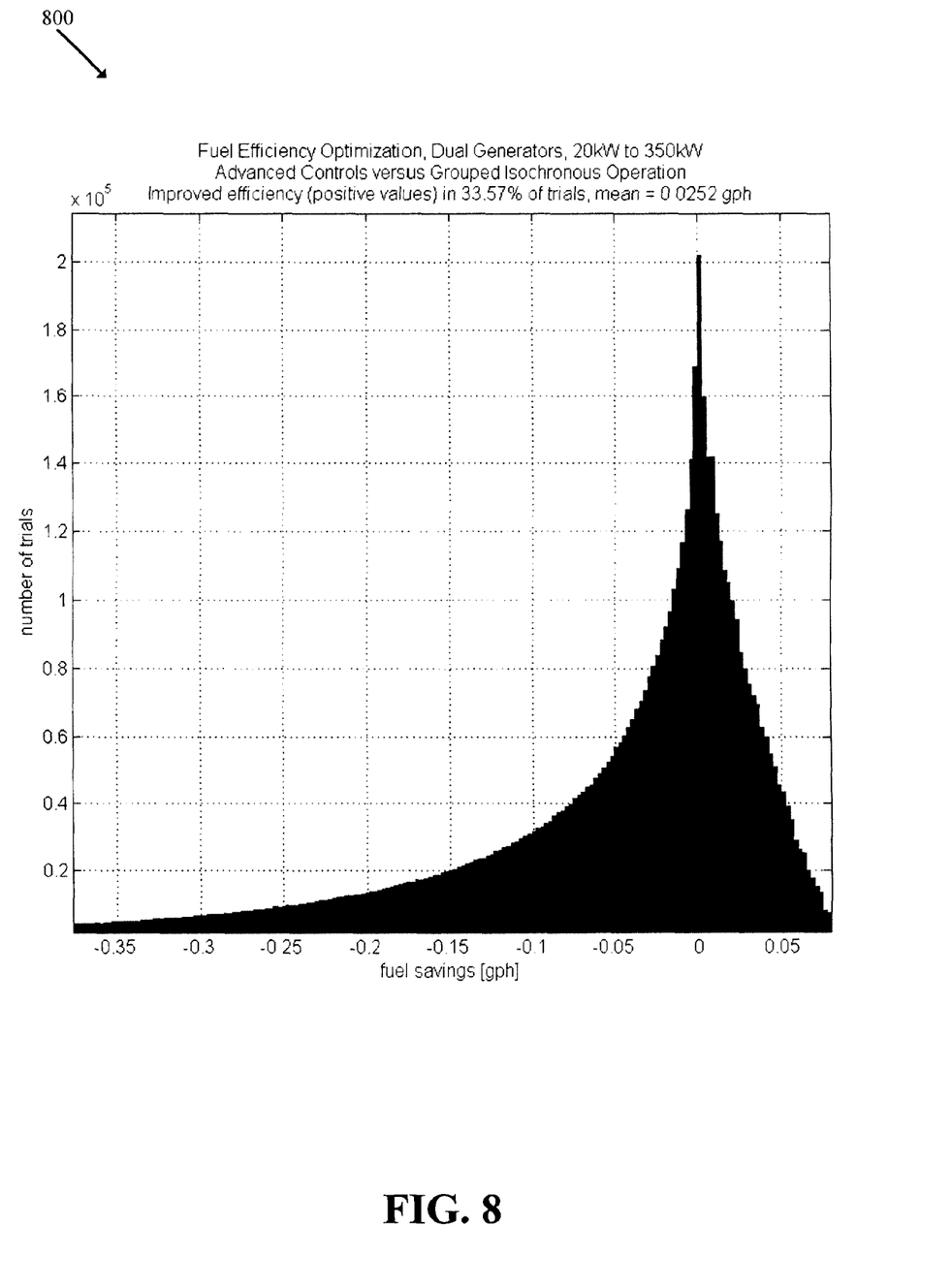
FIG. 8 illustrates a histogram showing the frequency of relative fuel efficiency improvement in random trials of the invention versus current best practice for systems utilizing two generators.
Figure 9:
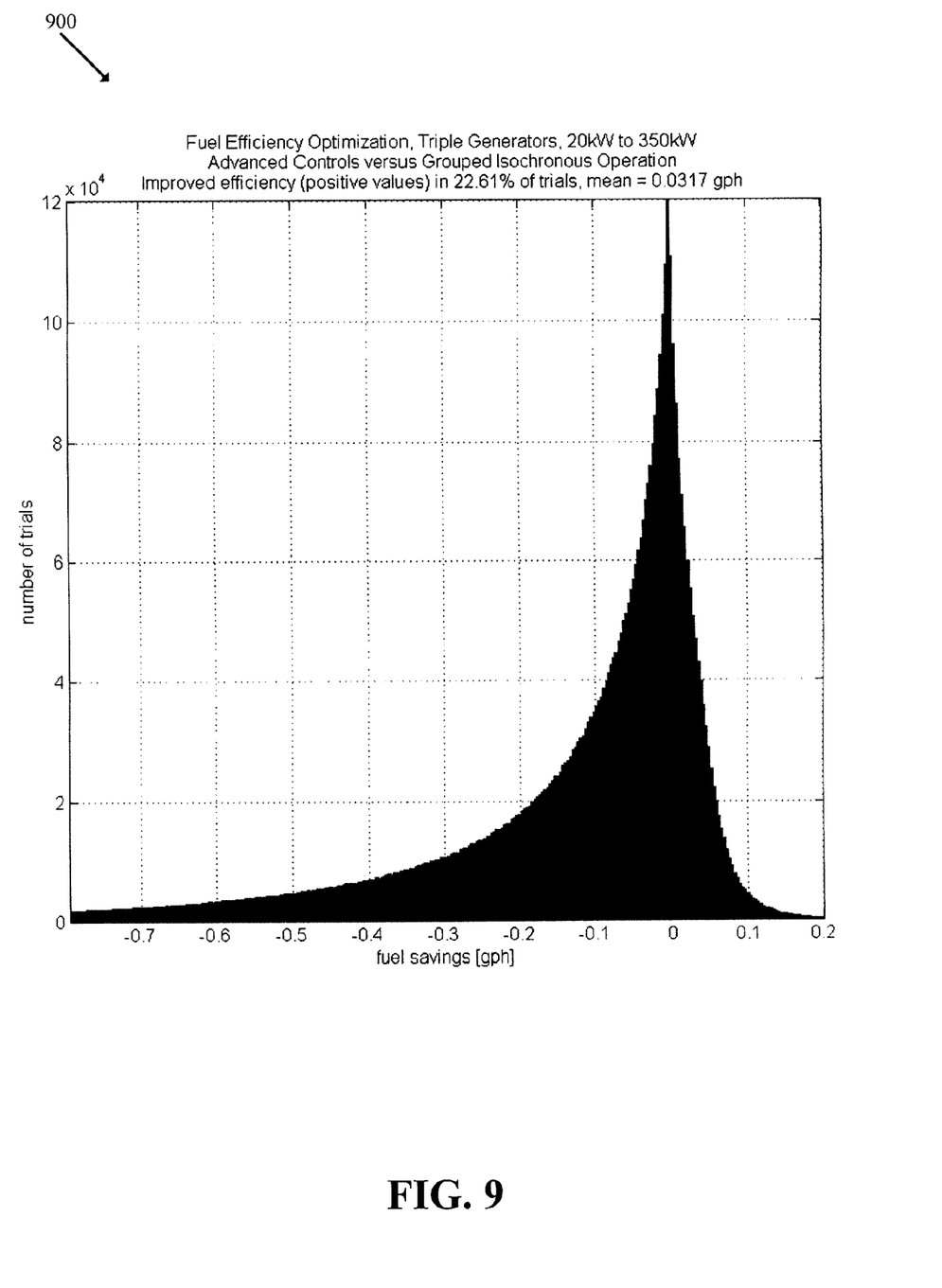
FIG. 9 illustrates a histogram showing the frequency of relative fuel efficiency improvement in random trials of the invention versus current best practice for systems utilizing three generators.

This benefit can be realized even if system loads are constant. Current best practice for systems running multiple generators with modern controls involves apportioning the aggregate load based on individual generator capacity as a percentage of total system capacity. As FIG. 8 and FIG. 9 illustrate, this is often not the optimal system configuration from a fuel efficiency perspective. The invention will identify the optimal system load partition in all cases, including those mishandled by the current best practice.

In some embodiments, the slope of the characteristic curve of each available generator may be ascertainable and may correspond to the incremental efficiency of the generator. In such a case, the system may evaluate each generator's current operating conditions to determine the load partition configuration that will minimize fuel usage. One of ordinary skill in the art will recognize that various other appropriate factors may also affect the optimum load partition configuration (e.g., size of each generator, response time of the generator, etc.). In addition, various embodiments may be optimized for various different desired goals. For instance, some embodiments may be implemented to optimize fuel consumption, while other embodiments may be implemented to optimize response time, to maximize stability, to maximize load availability, etc.

Figure 5:
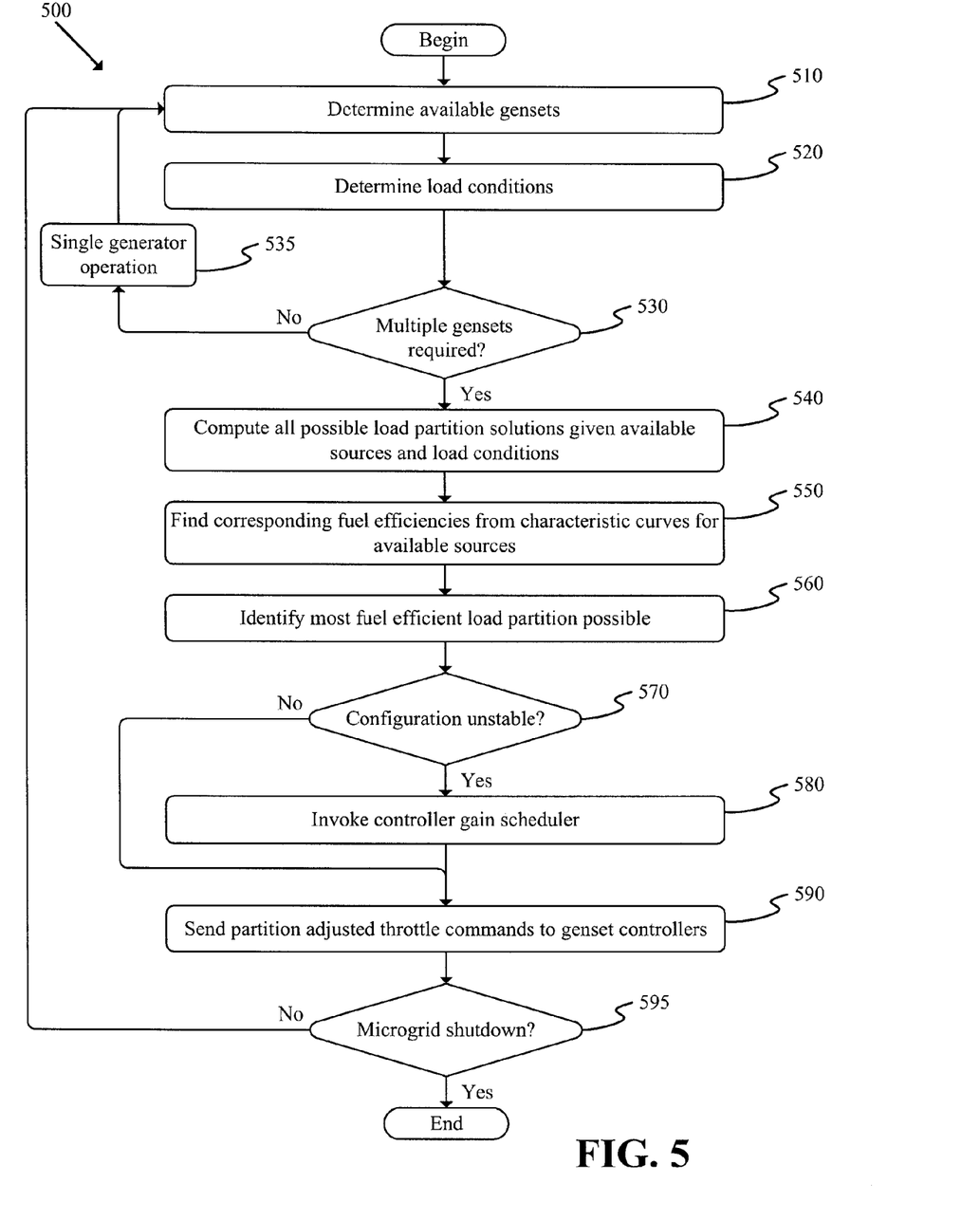
FIG. 5 illustrates a flow chart of a conceptual process used by some embodiments to optimize load partitioning among a set of generators connected to the system of FIG. 1.

FIG. 5 illustrates a flow chart of a conceptual process 500 used by some embodiments to optimize the load partition among a set of generators connected to the power grid 110 described above in reference to FIG. 1. FIG. 5 will be described with reference to FIGS. 1-4.

Process 500 may begin, for example, when a microgrid is activated. Alternatively, the process may be performed continuously or at regular intervals during operation of the power grid, when a change in load is presented, and/or at other appropriate times. Next, the process may determine (at 510) which genset are available. Such a determination may be made by, for example, the microgrid controller 120 based at least partly on information received on the first data and control bus 160 regarding the various generators 130.

The process may then determine (at 520) current load conditions. Such a determination may be made by, for example, the grid controller 120 based at least partly on information received on the second data and control bus 170 regarding the various loads 150.

Next, process 500 may determine (at 530) whether multiple generators are required. If the process determines that multiple generators are not required, the process may initiate (at 535) single generator system operation before repeating operations 510-530. When the process determines (at 530) that multiple gensets are required, the process may compute (at 540) all possible load partitioning solutions. Such a computation may be performed by, for instance, the microgrid controller 120. The computation may be performed using any appropriate granularity (e.g., the load partition solution may be computed at intervals of 5% change for each available generator) for a particular system.

The process may then find (at 550) corresponding fuel efficiencies from characteristic curves for the available sources. The curves may be retrieved from system data structures such as storage 195. Such curves may be similar to the curves described above in reference to FIGS. 2-4. Next, the process may identify (at 560) the most fuel-efficient load partitioning among generators based at least partly on the characteristic curves. Such identification may be performed by, for instance, the grid controller 120. In addition, the identification of the most fuel efficient load partition may be based at least partly on environmental data (e.g., data such as temperature, humidity, etc. received from environmental sensors 185), performance data (e.g., data received from performance sensors 190 such as fuel consumption, output, etc.), and/or other data (e.g., data such as maintenance data, manufacturer data, etc. retrieved from storage 195).

Next, process 500 may determine (at 570) whether the load partition identified at 560 is unstable relative to the current operating conditions. Such a determination may be made by, for instance, the grid controller 120. If the process determines that the load share is unstable, the process invokes (at 580) a gain scheduler. The gain scheduler may be designed to generate a set of generator control commands that change control loop gains, such that system stability is restored/maintained. The gain scheduler may be a component of the microgrid controller 120 in some embodiments. If the process determines (at 570) that the load share is not unstable, or after invoking (at 580) the gain scheduler, the process sends (at 590) control commands (e.g., partition-adjusted throttle commands) to the generator controllers (e.g., controllers 140).

The process then determines (at 595) if the microgrid has been shut down. If not, the process repeats operations 510-595 until the process determines (at 595) that the microgrid has been shut down.

One of ordinary skill in the art will recognize that process 500 may be performed in various different ways without departing from the spirit of the invention. For instance, the operations of the process may be performed in a different order. As another example, the process may be performed as multiple sub-processes or as part of a larger macro process. As yet another example, various operations may be divided into multiple sub-operations. Likewise, multiple operations may be combined into a single operation. Moreover, the process may be performed in conjunction with or in place of various other processes and/or sub-processes.

Figure 6:
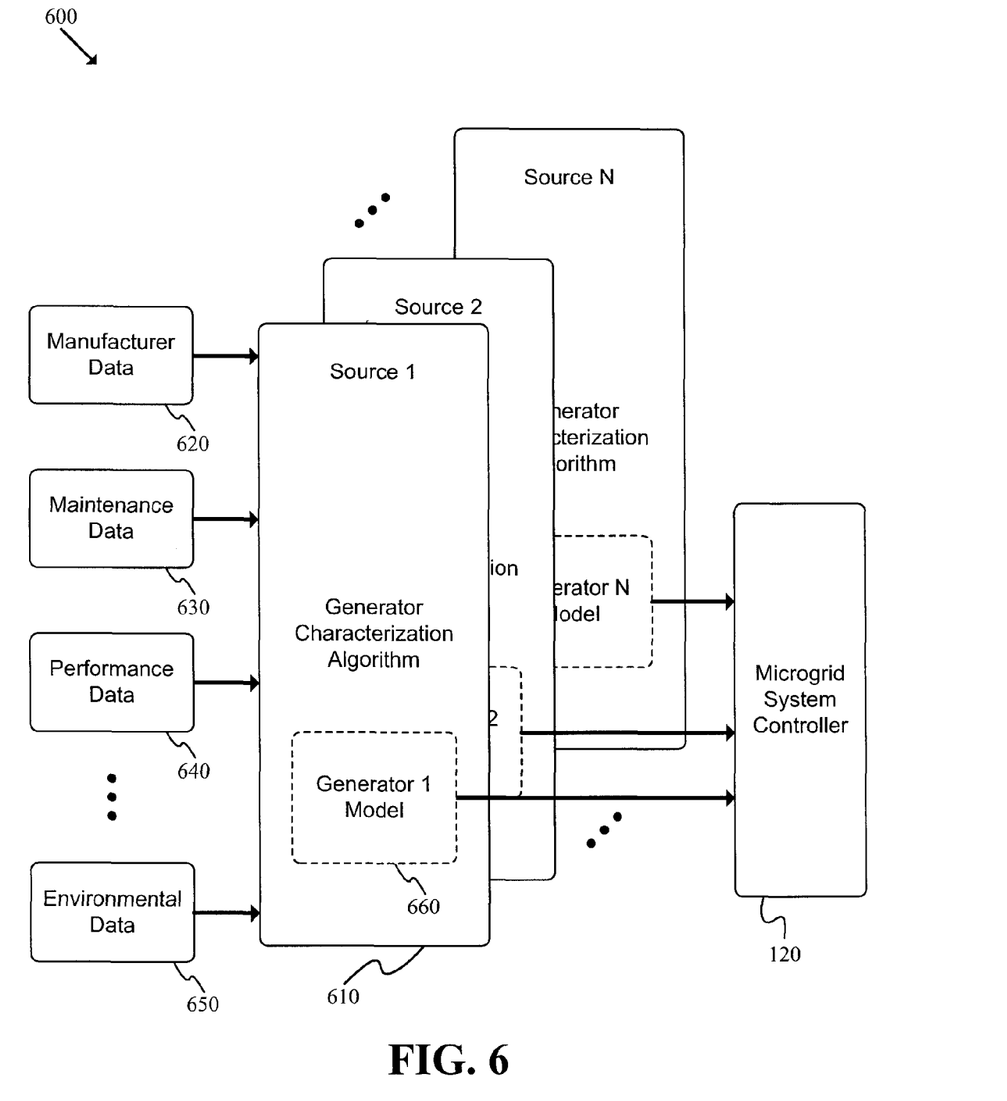
FIG. 6 illustrates a conceptual system used in some embodiments to update data related to performance of generators in the system of FIG. 1.

FIG. 6 illustrates a conceptual system 600 used in some embodiments to update data related to performance of generators used by system 100 described above in reference to FIG. 1. Specifically, this figure shows the use of various data sources to generate accurate characteristic data regarding the generators. As shown, the system 600 includes a generator characterization feature 610, a source of manufacturer data 620, a source of maintenance data 630, a source of performance data 640, a source of environmental data 650 and a way 660 of retaining generator data. This persistent collection of data constitutes a mathematical, heuristic model of individual generator behavior. As shown in FIG. 6, these data structures are duplicated for each power source the microgrid system is designed to accommodate.

The characterization feature 610 may be a combination of software and/or hardware components that are designed to be able to access the various data sources 620-650 and the generator model 660. In addition, the characterization feature may be designed to process data retrieved from the various sources. The characterization feature may be implemented as a component of the grid control 120 of FIG. 1 in some embodiments.

The various data sources 620-650 may be static and/or dynamic sources of data regarding the generators 130 of FIG. 1, the operating conditions of the grid 110 of FIG. 1, and/or other appropriate data.

For instance, the manufacturer data provided by the data source 620 may include generic data related to a particular model or type of generator. Alternatively, the manufacturer data may be associated with a particular generator (e.g., characterization data). As another example, the maintenance data provided by the data source 630 may include various records regarding the maintenance of available generators (e.g., that a particular generator is known to be running at less than optimal efficiency because it is overdue for service, etc.).

As yet another example, the performance data provided by the performance data source 640 may include various data gathered during the operation of a particular generator (thus, the load partition solution may be modified if, for example, a particular generator has a dirty air filter). As still another example, the environmental data provided by the environmental data sources 650 may include various current and historical data gathered during operation of the microgrid system. Such data may be gathered real-time, at appropriate intervals, etc.

The generator characterization (model) 660 may be accessible to the system controller (e.g., microgrid system controller 120 of FIG. 1), as well as the generator characterization feature 610. In this way, any updated generator data may be utilized by the system of FIG. 1 as the data becomes available.

In some embodiments, the system 600 may implement various characterization routines. For example, in some embodiments, the system may be implemented as a sub-part of the grid-controller 120 described above in reference to FIG. 1. In some of these embodiments, system 600 may retrieve and/or generate various characterization routines (e.g., a routine that varies a generator over its full range of output while monitoring fuel consumption over that range, a routine that varies multiple generators and monitors the power grid's output, etc.). The characterization routines may be automated (e.g., directed by a set of algorithms designed for that purpose) or implemented manually (e.g., a technician may perform various operations and/or measurements).

In some embodiments, the system 600, in conjunction with system 100, may be designed to self-configure and/or auto-calibrate the system 100. For instance, in some embodiments, when a new microgrid system is initially activated (the integration/test phase of commissioning), characterization system 600 and grid controller 120 may determine which generators 130 are available to the microgrid 110, which loads 150 are present, and/or what the current environmental or performance characteristics are. The characterization system 600 may then manipulate the generators (and loads) to characterize their performance under the intended range of operating conditions. This characterization phase can make use of actual system loads under microgrid control, or an 'intelligent' test load subsystem designed for the purpose. Such performance information may then be used to automatically determine and implement the optimal controls configuration (loop gains, etc.) for each individual generator such that the entire system will exhibit optimum stability and response times (power up, power down, load shed/restore operations, etc.). In this way, a microgrid system may be automatically configured, thus allowing grid systems to be built at lower cost with compressed integration/test schedules. The same functionality will enable auto-calibration operations at scheduled maintenance intervals with similar benefits.

The operation of system 600 will be further described by reference to FIG. 7 below.

Figure 7:
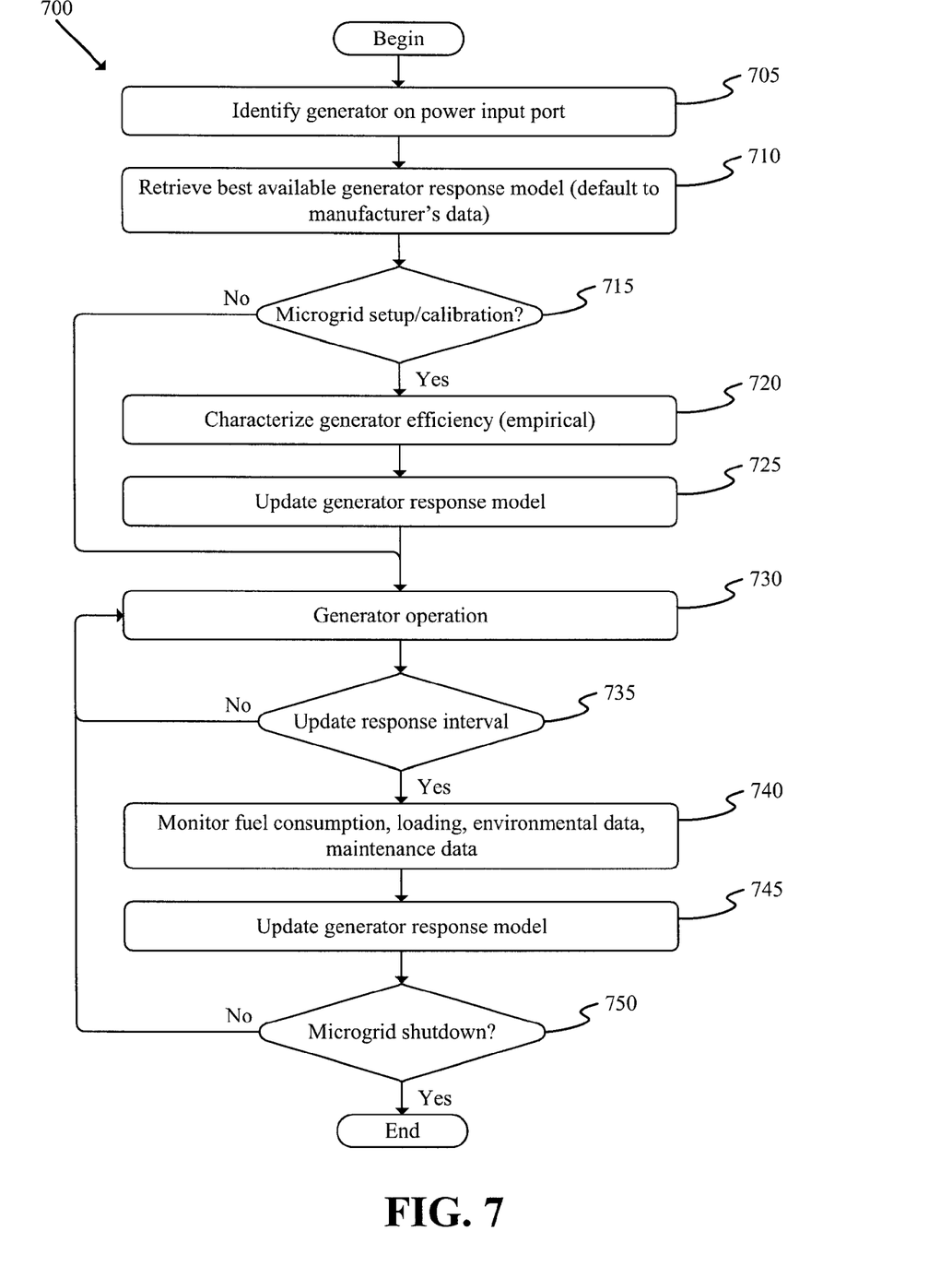
FIG. 7 illustrates a flow chart of a conceptual process used by some embodiments to automatically update generator data used by the system of FIG. 1.

FIG. 7 illustrates a flow chart of a conceptual process 700 that may be used by some embodiments to update generator data used by system 100 described above in reference to FIG. 1. Process 700 may be performed by an element such as the generator characterization feature 610 described above in reference to FIG. 6, or the grid controller 120 described above in reference to FIG. 7. Process 700 may begin when, for instance, a microgrid system is activated, at regular intervals, when new data becomes available, and/or at other appropriate times.

The process may then identify (at 705) generator(s) on a power input port and retrieve (at 710) best available generator response model (with manufacturer's data used as a default). Such data may be retrieved from the retained generator characterization (e.g., model 660 described above in reference to FIG. 6), or other appropriate source (e.g., input by a user, retrieved from a different archive, retrieved from a remote server over a network connection, etc.).

Next, process 700 may determine (at 715) if a setup/calibration cycle for the generator in question should be performed. If the process determines no calibration is necessary none is performed and normal generator operation may proceed (at 730). If a calibration is required, the process mayempirically characterizes (at 720) generator efficiency and the results may be used to update (at 725) that generator's response model 660.

During normal operation the generator response model 660 may be updated when the process determines (at 735) that an update response interval has been reached. This could be at a fixed time interval, or when relevant inputs exhibit changes large enough to warrant refining the model.

Such data may be retrieved from, for instance, elements such as data structures 620-650 described above in reference to FIG. 6. Alternatively or conjunctively, the data may be received in real-time (e.g., from sensors 185 and 190 described above in reference to FIG. 1, and monitored (at 740) in FIG. 7).

Process 700 may then update (at 745) the generator data. Such update may include various appropriate actions. For instance, in some cases the generator data for a particular generator may be completely replaced by empirical data developed at 720. As another example, the generator data may be amended to include the updated model developed at 745 (e.g., multiple datasets may be averaged over time, multiple datasets may be stored, each with reference to various associated operating conditions, etc.).

Next, process 700 may save (at 745) the refined generator characterization data. The data may be retained in a data structure that is available to, for example, the grid controller 120 described above in reference to FIG. 1 (e.g., data storage 195 of system 100).

Process 700 may then determine (at 750) whether the microgrid has been shut down. If so, the process repeats operations 730-750 until the process determines (at 750) that the microgrid has been shut down.

One of ordinary skill in the art will recognize that process 700 may be performed in various different ways without departing from the spirit of the invention. For instance, the operations of the process may be performed in a different order. As another example, the process may be performed as multiple sub-processes or as part of a larger macro process. As yet another example, various operations may be divided into multiple sub-operations. Likewise, multiple operations may be combined into a single operation. Moreover, the process may be performed in conjunction with or in place of various other processes and/or sub-processes.

FIG. 8 is a histogram 800 that illustrates the results of an experiment to establish the utility of the invention. The experiment compares fuel efficiency obtained with the invention to the current best practice (prior art). Current best practice for systems running multiple generators with modern controls involves apportioning the aggregate load based on individual generator capacity as a percentage of total system capacity. For example, with 2 generators, 40 kilowatts (kW) and 60 kW, the system would have a combined capacity of 100 kW. A 50 kW load would be apportioned such that the first generator would carry 0.4(50 kW)=20 kW and the second generator would supply 0.6(50 kW)=30 kW. The positive values shown in FIG. 8 indicate the number of experimental trials where this was not the most efficient load partitioning solution.

To conduct the experiment, two generators were chosen at random from a collection of fifteen generators for which load versus fuel efficiency characterizations were available. These ranged in capacity from 20 kW to 350 kW. Identical generators were allowed (e.g. a system with two 100 kW generators). Then all possible load partition solutions were calculated for loads such that a single generator could not supply them. The value on the horizontal axis indicates the difference in fuel consumption between the invention and current best practice as described above. Positive values are experimental trials where the invention (method and apparatus described) would improve efficiency. As shown, efficiency was improved in 33.57% of trials (versus a pro-rated capacity-based allocation), resulting in a mean savings of 0.0252 gallons per hour for those cases. It is important to note that this does not imply that the invention would be less efficient 66% of the time. In all operating conditions the invention would determine and implement the optimal solution.

FIG. 9 is a histogram 900 that illustrates the results of a second experiment to establish the utility of the invention. This experiment employed the same method described for FIG. 8 above except that 3 generators were chosen at random from the same set of candidate generators. Then all possible load partition solutions were calculated for loads such that three generators were required to supply them. As shown, efficiency was improved in 22.61% of trials (versus a pro-rated capacity-based allocation), resulting in a mean savings of 0.0317 gallons per hour for those cases.

These experiments demonstrate the utility of the invention. While the savings may seem modest, it's important to recall that many installations suitable for a microgrid control system run their generating equipment 24 hours per day, 365 days per year. Over time the efficiency gains would be significant.

Some embodiments may be implemented using combinations of software and hardware. Such software may include various algorithms implemented as machine executable instructions. Such hardware may include various combinations of one or more processors, memory elements, input/output devices, and/or other appropriate components.

It should be understood, of course, that the foregoing relates to exemplary embodiments of the invention and that modifications may be made without departing from the spirit and scope of the invention as set forth in the following claims.

We claim:

1. A system designed to optimize fuel efficiency of a power grid, the system comprising:
    a set of controllable generators designed to supply power to the power grid, each generator in the set being associated with a controller;
    a set of loads designed to draw power from the power grid;
    a set of data, control and power distribution components connecting the various system elements and sub-systems; and
    a microgrid control system including a single system controller communicating with each of said controllers and designed to analyze and control generator engine torques on a system wide basis, based at least partly on microgrid monitored system loading and to manage system operation and specifically to provide a continuously variable load assignment capability for the set of controllable generators based at least partly on the power requirements of the set of loads;
    wherein the system controller is configured to invoke a gain scheduler to change a control loop gain when a load share is determined to be unstable thereby making the power grid a self-configuring, auto-tuning grid.

2. The system of claim 1, further comprising a load partition configuration is based at least partly on data received from a set of environmental sensors.

3. The system of claim 1, further comprising a load partition configuration is based at least partly on data received from a set of performance sensors.

4. The system of claim 1, further comprising a load partition configuration is based at least partly on a plurality of datasets, each dataset being associated with a particular generator from the set of generators.

5. The system of claim 4, wherein each dataset from the plurality of datasets includes data regarding fuel consumption versus supplied load for the generator associated with the dataset.

6. The system of claim 1, wherein the set of controllable generators includes a plurality of diesel-powered generators, each diesel-powered generator having an associated controller.

7. The system of claim 1, wherein an automated initial configuration of the microgrid control system determines required control parameters for the set of controllable generators such that system stability, response time and efficiency are optimized and calibration of the required control parameters is performed when needed during normal operation or for routine maintenance.

8. A method of optimizing fuel efficiency for a power grid, comprising:
- determining a set of available generators each having a controller;
- determining a set of load conditions;
- in a single system controller communicating with said controllers, designed to analyze and control generator ermine torques on a system wide basis, based at least partly on microgrid monitored system loading, computing all possible load partition solutions for intervals of change for the set of available generators, with a desired granularity, based at least partly on the set of available generators and based at least partly on the set of load conditions, each possible load partition solution being associated with a total fuel consumption;
- identifying a load partition configuration with a minimum total fuel consumption from among all possible load sharing solutions; and
- determining whether the load partition configuration with the minimum total fuel consumption results in an unstable system, and invoking a gain scheduler to modify control parameters to correct the unstable system.

9. The method of claim 8, wherein the set of available generators includes a plurality of diesel-powered generators.

10. The method of claim 9, wherein identifying the load share with the minimum total fuel consumption includes evaluating a plurality of sets of characterization data, each set of characterization data being associated with a particular generator from the set of available generators.

11. The method of claim 10, wherein each set of characterization data includes a plurality of data points, each data point corresponding to a specific load and an associated fuel consumption.

12. The method of claim 8, including sending a set of control commands to the set of available generators based on the load partition with the minimum total fuel consumption.

13. The method of claim 12, wherein the set of control commands includes a plurality of load partition-adjusted throttle commands.

14. A method of updating a plurality of sets of generator data, each generator being one of a plurality of generators and controllers supplying a particular microgrid system, comprising:
- in a system controller designed to analyze and control generator engine torques on a system wide basis, based at least partly on microgrid monitored system loading, incorporating data published or supplied by the manufacturer to establish an initial set of generator characterizations for at least one of the plurality of generators;
- in said system controller, incorporating data developed during system setup and/or calibration;
- in said system controller, incorporating data gathered during operation from performance and environmental sensors;
- in said system controller, updating the initial set of generator characterizations based on the data developed during system setup and/or calibration and further based on the data gathered during operation from performance and environmental sensors; and
- retaining the updated set of generator characterizations until a next scheduled update interval.

15. The method of claim 14, wherein each of the sets of generator data comprises a set of characterization data indicating fuel consumption versus load.

16. The method of claim 15, wherein each of the sets of generator data comprises maintenance data.

17. The method of claim 16, wherein each of the sets of generator data comprises performance data.

18. The method of claim 17, wherein each of the sets of generator data comprises environmental data.

19. The method of claim 14, wherein the relevant updates comprise data related to components of the particular power grid.

* * * * *